United States Patent [19]

Scholtholt

[11] Patent Number: 4,901,190

[45] Date of Patent: Feb. 13, 1990

[54] DISTRIBUTION ARRANGEMENT FOR TELECOMMUNICATION APPARATUS

[75] Inventor: Hans Scholtholt, Munich, Fed. Rep. of Germany

[73] Assignee: Siemens Aktiengesellschaft, Berlin and Munich, Fed. Rep. of Germany

[21] Appl. No.: 278,627

[22] Filed: Dec. 1, 1988

[30] Foreign Application Priority Data

Mar. 25, 1988 [DE] Fed. Rep. of Germany ... 8804099[U]
Mar. 25, 1988 [DE] Fed. Rep. of Germany ... 8804098[U]

[51] Int. Cl.[4] .......... H02H 9/04
[52] U.S. Cl. .......... 361/119
[58] Field of Search .......... 361/332, 119

[56] References Cited

FOREIGN PATENT DOCUMENTS 2315838 10/1974 Fed. Rep. of Germany .
2621101 11/1977 Fed. Rep. of Germany ...... 361/119
2720220 11/1978 Fed. Rep. of Germany .
2725551 12/1978 Fed. Rep. of Germany .
3014796 10/1981 Fed. Rep. of Germany .
3625476 2/1988 Fed. Rep. of Germany .

*Primary Examiner*—Roy N. Envall, Jr.
*Attorney, Agent, or Firm*—Jeffrey P. Morris

[57] ABSTRACT

A distribution apparatus for telecommunication equipment wherein a contact component part is fastened on one side of a grounded bearing part and on the opposite side, a safety plug for the protection of electrical lines against voltage surges may be plugged in. The safety plug includes surge arresters resting with one pole against a grounding plate whose end is bent off laterally in the plug-in direction and is designed as grounding contacts which are acutely bent back on themselves and flexible, that substantially project beyond the safety plug. The grounding plate directly contacts the bearing part, thereby providing a maximum of transmitting reliability with a minimum of construction expenditure. The grounding contacts engage holes arranged within the range of an angled section of the bearing part.

6 Claims, 1 Drawing Sheet

DISTRIBUTION ARRANGEMENT FOR TELECOMMUNICATION APPARATUS

BACKGROUND OF THE INVENTION

1. Field of the Invention

The present invention relates generally to a distribution arrangement for telecommunication apparatus with a safety plug for a contact component part which is provided with a terminal connecting components for incoming and outgoing electrical leads.

2. Description of the Prior Art

A safety plug of the type as referred to herein is generally known, for example, in German Patent Application DE-OS No. 30 14 796. This safety plug has plug-in blades that can be plugged into a terminal strip, as is shown, for example, in German Patent Application DE-OS No. 27 25 551. A terminal strip of this type has corresponding spring contacts that are connected to the electrical leads. The safety plug is provided with surge arresters that are connected with the plug-in blades. A pole of the surge arresters is coupled to a grounding bar which has lateral contact blades that resemble the plug-in blades in kind and in size. The ground potential is conducted to the grounding bar via these contact blades.

It is further known from German Patent Application DE-OS No. 27 20 220 to set the grounding bar directly into the contact component part. The safety plug, in this case, becomes merely a holder for the surge arresters, that are inserted in the contact component part. The grounding bar is connected with a grounded bearing rail for the contact component part, via a bow-type leaf spring. However, a safety plug of this kind has the drawback that, in case a surge arrester must be changed, the entire plug must be removed, so that the leads are not protected during that time.

It is therefore a primary object of the present invention to conduct the ground potential to the safety plug in the simplest and safest possible manner.

A contact arrangement such as is known from German Patent Application DE-OS 36 25 476 includes, with reference to FIG. 1, a flat safety plug with surge protection components to protect subscriber lines that are connected frontally to terminal connecting components of a layer distributor. The terminal connecting components, for their part, are connected with the surge protection components, via plug-in contacts. A curved bearing plate has stamped-out spring legs 21, between which the safety plug is inserted with a contact zone 22. The contact zone is coupled electrically with the protective components that are designed as, eg. surge arresters, so that surges that may occur can be diverted to the grounded bearing plate. The contact points of the spring legs are designed in spherical form, so that a relatively small, point-like contact surface will result.

It is also known from German Patent Application DE-OS No. 23 15 838, to provide the safety plug with a grounding plate on its backside, that rests via contact fingers at any given time against one pole of the surge arresters, and that is contacted on the longitudinal edge on its backside by means of spring fingers of the spring plate carrying the potential, which is held fast to the component-bearing part. This, too, results in a relatively small contact area between the safety plug and the curved spring finger of the grounded component-bearing part.

SUMMARY OF THE INVENTION

In accordance with the present invention, the ground potential is transmitted directly from the component-bearing part to the safety plug. This eliminates the current path via the contact component part, thus eliminating extra sources of trouble. There is therefore no need to provide component parts of any kind in the contact component part for the transmission of the ground potential.

Component parts of this type are provided with or without safety plugs, depending on geographic location. The saving therefore extends to contact component parts that are supplied without safety plugs, as well.

The grounding contact can rest directly against corresponding contact surfaces of the component-bearing part. However, it is also within the scope of the invention for the component-bearing part to be provided with, a contact film of superior contact grade and to contact it with the grounding contact of the safety plug. The safety plug can also be contacted with a bearing rail that is arranged on the other side of the contact component part. The finger-like protruding grounding contact is carried in a guiding channel, which serves simultaneously for the exact positioning of the safety plug relative to the contact component part.

The outside lines of a telecommunication installation can unintentionally come in contact with variably high overvoltages. Modern electronic switching installations are sensitive to even mild surges, which must be diverted as reliably as very strong ones. It is thus important that the contact can not only withstand strong surges, but also has a negligible contact resistance for negligible surges.

Both high and low excess voltages can be repeatedly and reliably deflected with modest construction expenditure. The grounding contact designed as a double contact has a small-area and a large-area contact point. The small-area contact point by reason of the high surface pressure has a negligible contact resistance even with surfaces of low precious-metal content. At the large-area contact point, greater surges are distributed over a larger surface. The greater specific contact resistance in that case does not impair the diversion of strong surges.

A simple form of the spring contact, described in which inner edge of the punched-out opening is free of impurities or oxide film. Because of the high surface pressure, a reliable grounding contact results here, with low contact resistance. The opposite contact is part of a grounded bearing rail for distributor component parts. It is bent into an L-shaped profile. The opening extends substantially to one side of the bent edge, but also to a small extent into the other leg of the bearing rail. The other leg of the spring contact rests flat against said other leg. This results in a large contact area over which the especially high voltage peaks can be diverted quite simply.

The foregoing and other objects and advantages of the invention will become apparent with reference to the description of a preferred embodiment and to the drawings wherein:

DESCRIPTION OF THE PREFERRED EMBODIMENT

Figure 1:
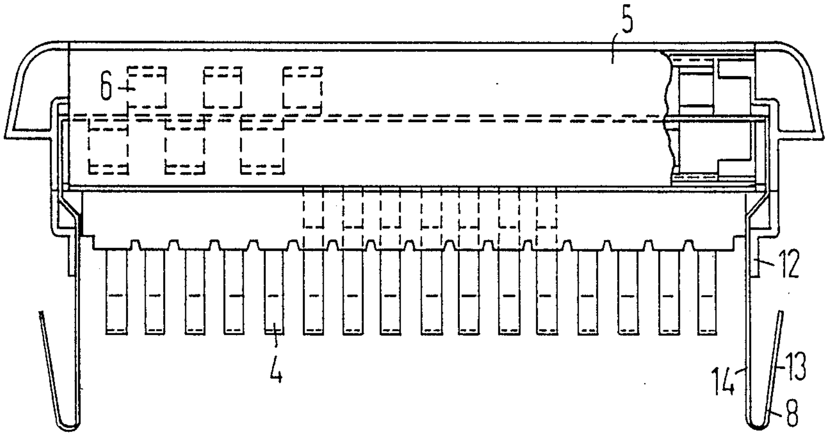
FIG. 1 is a side view of a safety plug for a distribution component part.
Figure 2:
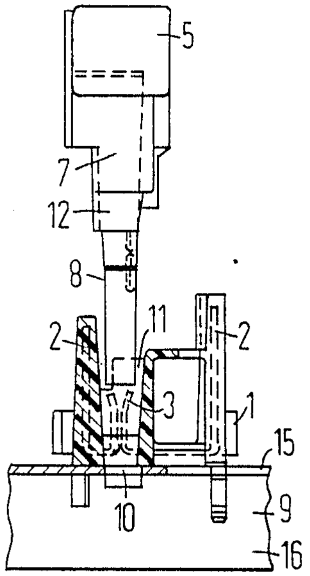
FIG. 2 a frontal view of the safety plug according to FIG. 1, with a distribution component part and a component-bearing part for the distribution component part, prior to their being assembled.
Figure 3:
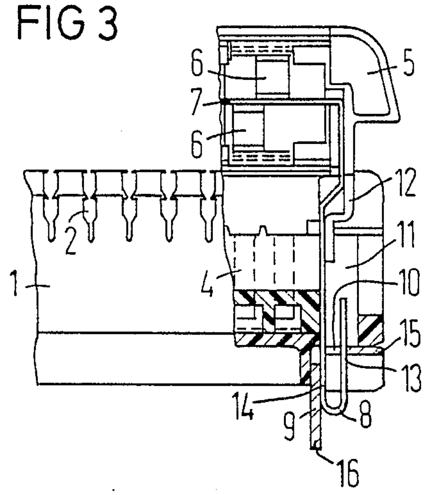
FIG. 3 is a side view of the parts according to FIG. 2 after being assembled, all in accordance with the invention.

In accordance with FIGS. 1, 2 and 3, a contact component part 1 is provided with covered terminal connecting components 2 for incoming and outgoing lines of a telephone switching center. The contact component part 1 has contact springs 3 connected to the terminal connecting components 2, which contact springs serve as opposite contacts for the plug-in contacts in the form of plug-in blades of a safety plug 5. However, the plug-in blades 4 are contact parts, which are not illustrated herein in greater detail, but which are connected at any given time with one pole of a surge arrester 6, whose other pole rests against a grounding plate 7 of the safety plug 4.

The grounding plate 7 is bent substantially at a right angle to both surfaces of the safety plug 5 and in the plug-in direction and projects substantially beyond the plug-in blades 4. With its free end, it forms a grounding contact 8 which is electrically coupled with a grounded bearing part 9 for the contact component part 1. The end of the grounding plate 7, which is finger-shaped and designed as a grounding contact 8, is bent at an acute angle, bent back on itself and forms two spring legs, 13, 14, that are flexibly braced against each other within a rectangular opening 10 of the bar-like bearing part 9, as can be seen with reference to FIG. 3.

The bearing part 9 is bent into an L-shaped bar one of whose legs 16 extends in the plug-in direction of the grounding contact 8. The opening 10 is within the bent area. The punched-out opening 10 extends from the bent edge substantially into the other leg 15. The grounding contact 8 projects substantially through the opening 10 and rests with one leg, over a large surface, against the spring leg 14 extending in the plug-in direction, of the bearing part 9. The other spring leg 13 of the grounding contact 8 rests, over a small surface, against the oppositely located inner edge of the opening 10. By means of this double contact, occuring voltage surges can be transmitted in great bandwidth to the grounded bearing part 9 and diverted.

The contact component part 1 has a groove-like guiding channel 11 for the grounding contact 8, so that the latter is protected from touching and kinking. The housing of the safety plug 5 has a projection 12 covering the foot of the grounding contact 8, that can be inserted with little play in the guiding channel 11 of the contact component part 1. The projection 12 and the guiding channel 11 are slanted at an acute angle relative to the plug-in direction, which facilitates the assembly of the two parts.

I claim:

1. In a distribution apparatus for telecommunication equipment having a safety plug which plugs into a contact component part which is provided with terminal connecting components for incoming and outgoing electrical leads of telecommunications equipment, wherein the contact component part is held fast to at least one grounded bearing part, and wherein the safety plug has plug-in blades for corresponding opposite contacts of the contact component part connected to the terminal connecting components and a grounding contact which is connected to ground, the improvement comprising:

said grounded bearing part having a bar-shape and being located at a lower surface of said contact component part to one side of said contacts of the contact component part; and said safety plug being plugged in a plug-in direction into said contact component part at an upper surface thereof opposite from the grounded bearing part, and said grounded contact of said safety plug being located to one side of said plug-in blades and shaped generally in the form of a finger projecting in the plug-in direction beyond the plug-in blades so that it makes contact with said grounded bearing part at the lower surface of said contact component part.

2. A distribution apparatus according to claim 1, wherein said contact component part includes a groove-shaped guiding channel for guiding said grounded contact of said safety plug in the plug-in direction to said grounded bearing part.

3. A distribution apparatus according to claim 2, wherein said safety plug includes a housing having a projection which covers a foot portion of said grounding contact where it extends from said housing, said projection being insertable with substantially no play into said guiding channel of said contact component part.

4. A distribution apparatus according to claim 3, wherein said projection and said guiding channel have corresponding edges which are slanted at an acute angle relative to the plug-in direction.

5. A distribution apparatus according to claim 1, provided with surge protection components coupled through said grounding contact for diverting voltage surges, wherein said finger of said grounding contact is formed with two spring legs, one of which rests in contact with a large surface and the other of which rests in contact with a smaller surface of said grounded bearing part.

6. A distribution apparatus according to claim 5, wherein said finger of said grounding contact is bent in a U-shape to form the two spring legs, and said grounded bearing part has an L-shaped cross section formed with one bearing leg extending in the plug-in direction, another bearing leg perpendicular to the plug-in direction, and an opening at the intersection of the two bearing legs, such that said finger of said grounding contact is insertable in said opening with one spring leg thereof resting flatly against and in contact with a large surface of said one bearing leg and the other spring leg rests against an edge of the other bearing leg adjacent said opening.

* * * * *